US006082491A

United States Patent [19]

Collier

[11] Patent Number: 6,082,491

[45] Date of Patent: Jul. 4, 2000

[54] INFLATABLE SLIDE FOR ATTACHMENT TO A HOUSE WINDOW

[76] Inventor: Winsome Collier, 114-15 207 St. Cambria Heights, Queens, N.Y. 11411

[21] Appl. No.: 09/220,036

[22] Filed: Dec. 23, 1998

[51] Int. Cl.$^{7}$ .................................................... B65G 11/10

[52] U.S. Cl. ............................. 182/48; 244/905; 182/70; 182/206

[58] Field of Search ................................ 182/48, 70, 206; 244/905, 137 P

[56] References Cited

U.S. PATENT DOCUMENTS

| | | | |
|---|---|---|---|
| D. 340,965 | 11/1993 | Lee | D21/244 |
| 797,012 | 8/1905 | McPheeters | 182/48 |
| 2,297,544 | 9/1942 | Elwood | 182/48 |
| 2,381,809 | 8/1945 | Elwood | 182/48 |
| 2,955,299 | 10/1960 | Ingram | 182/48 |
| 3,092,232 | 6/1963 | Adams . | |
| 3,554,344 | 1/1971 | Summer . | |
| 3,973,645 | 8/1976 | Dix | 182/48 |
| 4,434,870 | 3/1984 | Fisher | 182/48 |
| 4,526,262 | 7/1985 | Malcolm | 182/48 |
| 4,723,628 | 2/1988 | Fisher | 182/48 |
| 5,301,630 | 4/1994 | Genovese | 182/48 |
| 5,360,186 | 11/1994 | Danielson | 244/137 |
| 5,499,692 | 3/1996 | Brook | 182/196 |

*Primary Examiner*—Alvin Chin-Shue

[57] ABSTRACT

An inflatable slide for attachment to a house window including an elongated self-inflating slide portion having an upper end, an enlarged lower end, and an intermediate extent therebetween. The slide portion further includes a pair of opposed raised side portions extending a length thereof with a generally planar central sliding portion disposed therebetween. The upper end is secured to an outside of a house immediately below a window of the house whereby an unobstructed space exists between the window and a ground surface therebelow. The slide portion has a length greater than a length between the window and the ground surface whereby the enlarged lower end rests on the ground surface creating an obtuse angle with respect to the slide portion. A safety system is coupled with respect to the slide portion. The safety system prevents a user from falling off the slide portion during use.

2 Claims, 2 Drawing Sheets

INFLATABLE SLIDE FOR ATTACHMENT TO A HOUSE WINDOW

BACKGROUND OF THE INVENTION

The present invention relates to an inflatable slide for attachment to a house window and more particularly pertains to providing a safe escape from a burning house.

Inflatable evacuation slides are now installed on substantially all passenger-carrying aircraft to provide a means for rapid evacuation from the aircraft in the event of an emergency. In a normal situation, the aircraft door is situated so that the inflatable evacuation slide can extend directly outward therefrom with the bottom of the slide resting on a lower surface to provide a straight-line sliding surface from the aircraft door to the lower surface.

These evacuation slides, however, are not adapted for use with a house or other building where fires and the need for a rapid evacuation are more prevalent. There exists a need for a means for a rapid evacuation from a housing or other building in the event of a fire or other emergency. The present invention seeks to provide the solution to this problem.

The use of evacuation slides is known in the prior art. More specifically, evacuation slides heretofore devised and utilized for the purpose of providing a means for evacuation from an aircraft are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,973,645 to Dix et al. discloses an inflatable evacuation slide that is to be deployed from an aircraft exit. U.S. Pat. No. 4,434,870 to Fisher discloses an evacuation slide device comprised of a dual lane slide panel and two independently inflatable chambers. U.S. Pat. No. 5,360,186 to Danielson et al. discloses an inflatable slide raft assembly that can be used both as a slide for land evacuation of passengers and can also be used as a slide raft for water evacuation of passengers. U.S. Pat. No. 4,723,628 to Fisher discloses an evacuation slide for use on elevated trains where there is a restricted clearance space on either side of the railway car. U.S. Pat. No. Des. 340,965 to Lee discloses the ornamental deign for an inflatable slide.

While these devices fulfill their respective, particular objective and requirements, the aforementioned patents do not describe an inflatable slide for attachment to a house window for providing a safe escape from a burning house.

In this respect, the inflatable slide for attachment to a house window according to the present invention substantially departs from the conventional concepts and designs of the prior art, and in doing so provides an apparatus primarily developed for the purpose of providing a safe escape from a burning house.

Therefore, it can be appreciated that there exists a continuing need for new and improved inflatable slide for attachment to a house window which can be used for providing a safe escape from a burning house. In this regard, the present invention substantially fulfills this need.

SUMMARY OF THE INVENTION

In the view of the foregoing disadvantages inherent in the known types of evacuation slides now present in the prior art, the present invention provides an improved inflatable slide for attachment to a house window. As such, the general purpose of the present invention, which will be described subsequently in greater detail, is to provide a new and improved inflatable slide for attachment to a house window and method which has all the advantages of the prior art and none of the disadvantages.

To attain this, the present invention essentially comprises an elongated self-inflating slide portion having an upper end, an enlarged lower end, and an intermediate extent therebetween. The slide portion further includes a pair of opposed raised side portions extending a length thereof with a generally planar central sliding portion disposed therebetween. The upper end is secured to an outside of a house immediately below a window of the house whereby an unobstructed space exists between the window and a ground surface therebelow. The slide portion has a length greater than a length between the window and the ground surface whereby the enlarged lower end rests on the ground surface creating an obtuse angle with respect to the slide portion. The raised side portions each have a channel formed therein and extend a length thereof. The channels each have a pliable flap disposed thereover. A plurality of weights are disposed interiorly of the enlarged lower end of the slide portion. A safety system is coupled with respect to the slide portion. The safety system includes a pair of cables extending within the channels of the raised side portions between opposing ends thereof. Each of the cables have a securement strap slidably coupled thereto. The securement straps have hook and loop fasteners disposed on opposing free ends thereof for securement of the straps to wrists of a user. The securement straps each have a loop coupled therewith for coupling the securement straps to the cables. The safety system prevents a user from falling off the slide portion during use. A release strap is provided having an inner portion secured to the house and an outer portion releasably secured to the upper end of the slide portion for containing the slide portion in a delated orientation. Whereby removal of the outer portion of the release strap from the slide portion will enable the slide portion to fully inflate for use.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved inflatable slide for attachment to a house window which has all the advantages of the prior art evacuation slides and none of the disadvantages.

It is another object of the present invention to provide a new and improved inflatable slide for attachment to a house window which may be easily and efficiently manufactured and marketed.

It is a still further object of the present invention to provide a new and improved inflatable slide that is portable, thereby allowing said slide to be carried in emergency vehicles, namely fire trucks and ambulances. Further, the slide may also be available in public buildings, such as schools and hospitals for quick and safe evacuation in case of an emergency situation.

It is a further object of the present invention to provide a new and improved inflatable slide for attachment to a house window which is of durable and reliable construction.

An even further object of the present invention is to provide a new and improved inflatable slide for attachment to a house window which is susceptible of a low cost of manufacture with regard to both materials and labor, and which accordingly is then susceptible of low prices of sale to the consuming public, thereby making such an inflatable slide for attachment to a house window economically available to the buying public.

Even still another object of the present invention is to provide a new and improved inflatable slide for attachment to a house window for providing a safe escape from a burning house.

Lastly, it is an object of the present invention to provide a new and improved inflatable slide for attachment to a house window including an elongated self-inflating slide portion having an upper end, an enlarged lower end, and an intermediate extent therebetween. The slide portion further includes a pair of opposed raised side portions extending a length thereof with a generally planar central sliding portion disposed therebetween. The upper end is secured to an outside of a house immediately below a window of the house whereby an unobstructed space exists between the window and a ground surface therebelow. The slide portion has a length greater than a length between the window and the ground surface whereby the enlarged lower end rests on the ground surface creating an obtuse angle with respect to the slide portion. A safety system is coupled with respect to the slide portion. The safety system prevents a user from falling off the slide portion during use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
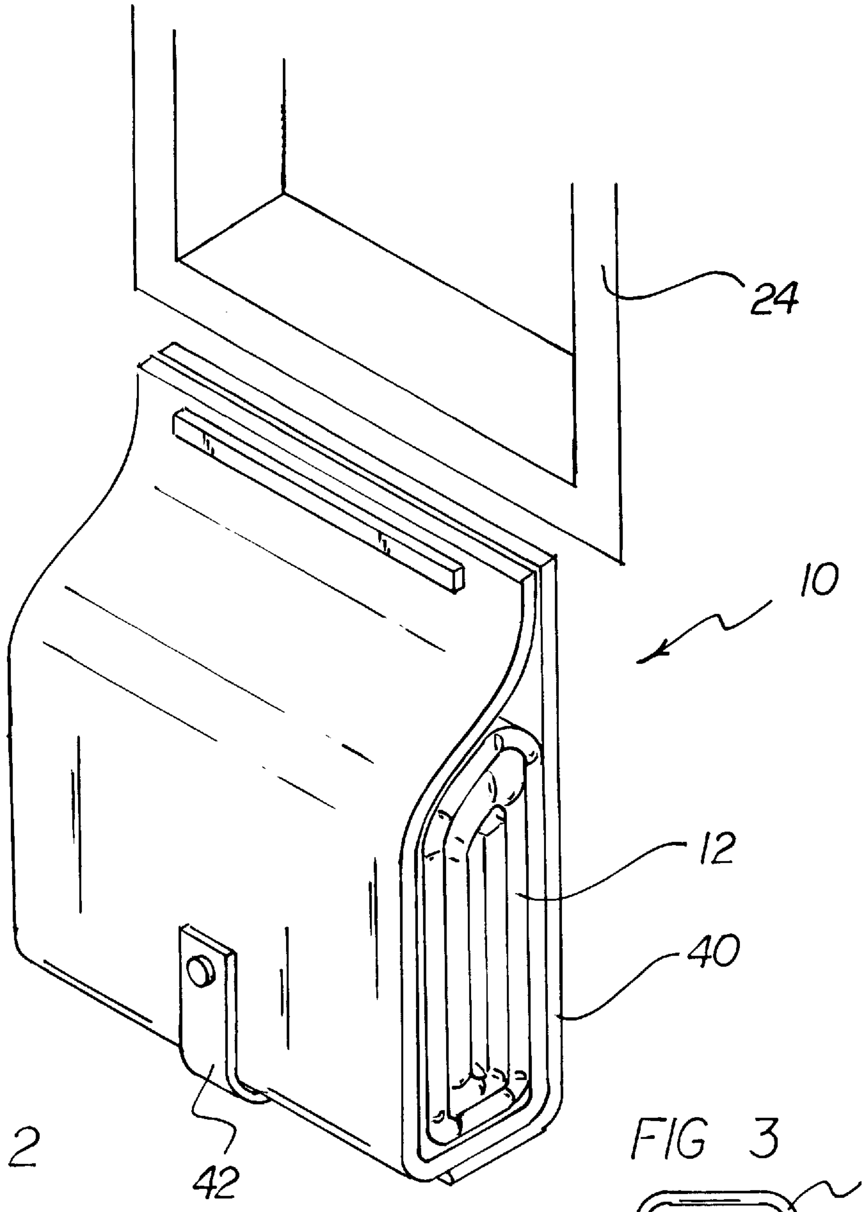
FIG. 1 is a perspective view of the preferred embodiment of the inflatable slide for attachment to a house window constructed in accordance with the principles of the present invention.
Figure 2:
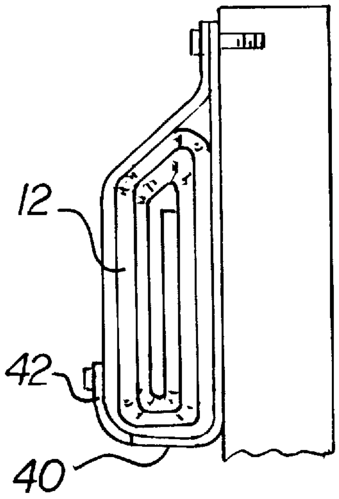
FIG. 2 is a side elevation view of the present invention.

With reference now to the drawings, and in particular, to FIGS. 1 through 5 thereof, the preferred embodiment of the new and improved inflatable slide for attachment to a house window embodying the principles and concepts of the present invention and generally designated by the reference number 10 will be described.

Specifically, it will be noted in the various Figures that the device relates to a inflatable slide for attachment to a house window for providing a safe escape from a burning house. In its broadest context, the device consists of an elongated self-inflating slide portion, a plurality of weights, a safety system, and a release strap. Such components are individually configured and correlated with respect to each other so as to attain the desired objective.

The elongated self-inflating slide portion 12 has an upper end 14, an enlarged lower end 16, and an intermediate extent 18 therebetween. The slide portion 12 further includes a pair of opposed raised side portions 20 extending a length thereof with a generally planar central sliding portion 22 disposed therebetween. The upper end 14 is secured to an outside of a house immediately below a window 24 of the house whereby an unobstructed space exists between the window 24 and a ground surface therebelow. The slide portion 12 has a length greater than a length between the window 24 and the ground surface whereby the enlarged lower end 16 rests on the ground surface creating an obtuse angle with respect to the slide portion 12. The raised side portions 20 each have a channel 26 formed therein and extend a length thereof. The channels 26 each have a pliable flap 28 disposed thereover.

A plurality of weights 30 are disposed interiorly of the enlarged lower end 16 of the slide portion 12. Note FIG. 4. The weights 30 will prevent the slide portion 12 from raising or shifting during use.

A safety system is coupled with respect to the slide portion 12. The safety system includes a pair of cables 32 extending within the channels 26 of the raised side portions 20 between opposing ends thereof. Each of the cables 32 have a securement strap 34 slidably coupled thereto. The securement straps 34 have hook and loop fasteners 36 disposed on opposing free ends thereof for securement of the straps 34 to wrists of a user. The securement straps 34 each have a loop 38 coupled therewith for coupling the securement straps 34 to the cables 32. The safety system prevents a user from falling off the slide portion 12 during use.

The release strap 40 is provided having an inner portion secured to the house and an outer portion 42 releasably secured to the upper end 14 of the slide portion 12 for containing the slide portion 12 in a delated orientation. Note FIGS. 1–3. Whereby removal of the outer portion 42 of the release strap 40 from the slide portion 12 will enable the slide portion 12 to fully inflate for use. Note FIGS. 4 and 5.

Figure 3:
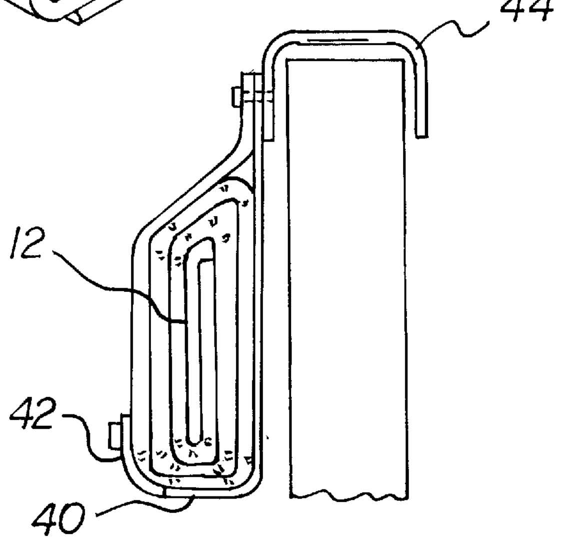
FIG. 3 is a side elevation view of an alternate embodiment of the present invention.
Figure 4:
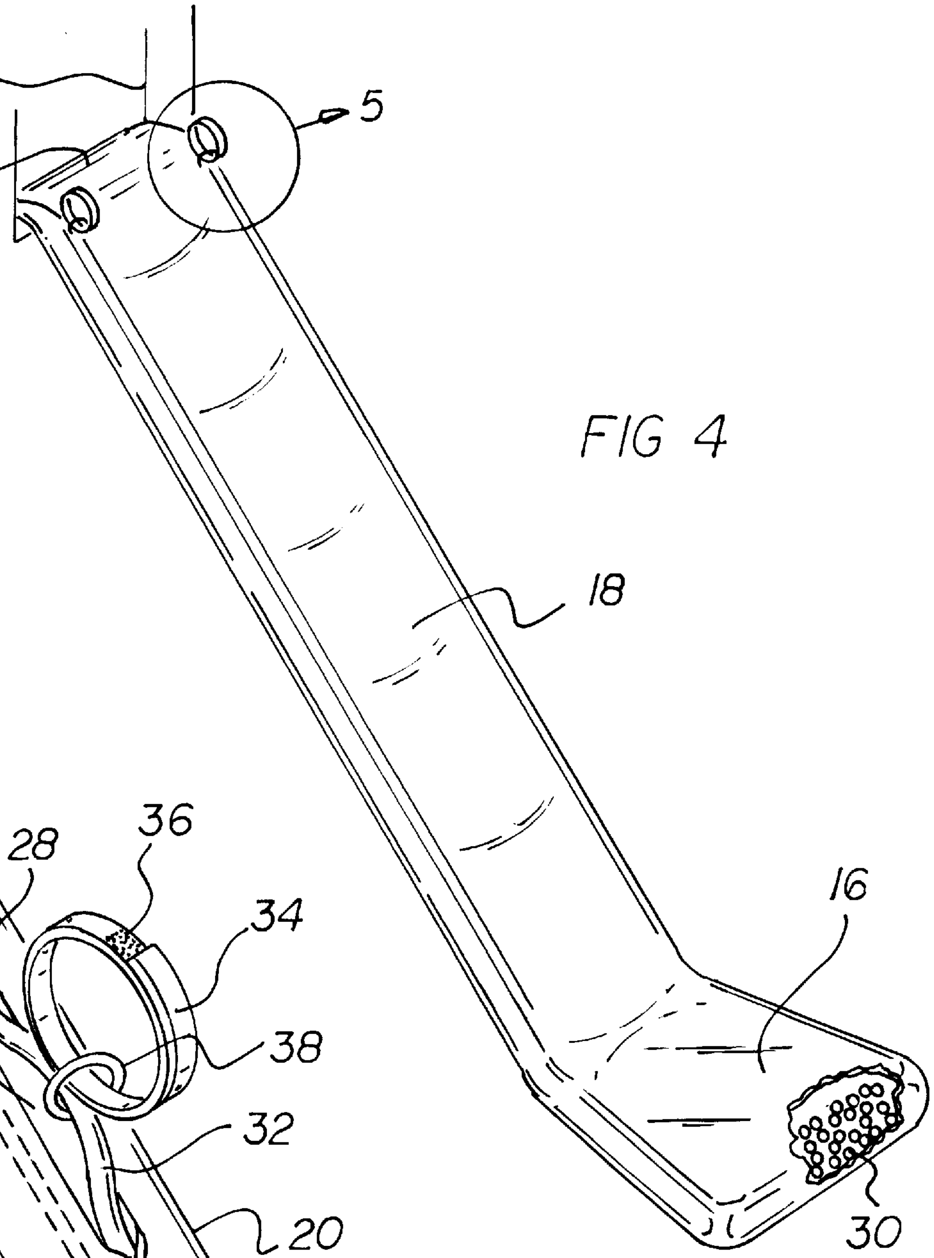
FIG. 4 is a perspective view of the present invention illustrated in an inflated orientation.
Figure 5:
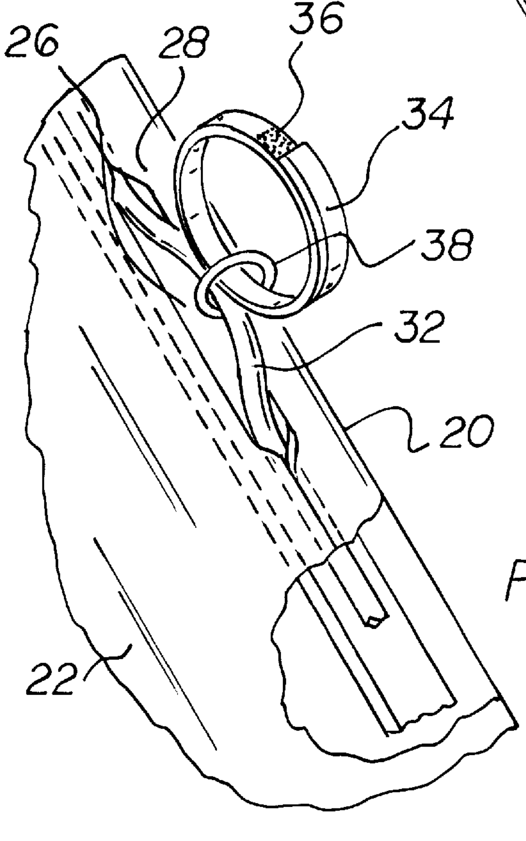
FIG. 5 is a sectional view of the present invention as taken from circle 5 of FIG. 4.

A second embodiment of the present invention is shown in FIG. 3 and includes substantially all of the components of the present invention except that the slide portion 12 is removably secured with respect to the window. The upper end of the slide portion 12 has an inverted U-shaped member

44 secured thereto for resting on the lower end of the window frame when the window is open. This feature allows for the device 10 to be moved to any window in the house to avoid danger that might exist near a particular window.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An inflatable slide for attachment to a house having a window located above the ground surface defining a length between said ground surface and window, for providing a safe escape from a burning house comprising, in combination:

an elongated self-inflating slide portion having an upper end, an enlarged lower end, and an intermediate extent therebetween, the slide portion further including a pair of opposed raised side portions extending a length thereof with a generally planar central sliding portion disposed therebetween, the upper end securable to an outside of the house immediately below the window whereby an unobstructed space exists between the window and the ground surface therebelow, the slide portion having a length greater than the length between the window and the ground surface to enable the enlarged lower end to rest on the ground surface creating an obtuse angle with respect to the slide portion, the raised side portions each having a channel formed therein and extending a length thereof, the channels each having a pliable flap disposed thereover;

a plurality of weights disposed interiorly of the enlarged lower end of the slide portion;

a safety system coupled with respect to the slide portion, the safety system including a pair of cables extending within the channels of the raised side portions between opposing ends thereof, each of the cables having a securement strap slidably coupled thereto, the securement straps having hook and loop fasteners disposed on opposing free ends thereof for securement of the straps to wrists of a user, the securement straps each having a loop coupled therewith for coupling the securement straps to the cables, the safety system for preventing a user from falling off the slide portion during use;

a release strap having an inner portion secured to the house and an outer portion releasably secured to the upper end of the slide portion for containing the slide portion in a delated orientation, whereby removal of the outer portion of the release strap from the slide portion will enable the slide portion to fully inflate for use.

2. An inflatable slide for attachment to a house having a window located above the ground surface defining a length between said ground surface and window, for providing a safe escape from a burning house comprising, in combination:

an elongated self-inflating slide portion having an upper end, an enlarged lower end, and an intermediate extent therebetween, the slide portion further including a pair of opposed raised side portions, each having a channel formed therein said channel having a pliable flap disposed thereover, said side portions extending a length thereof with a generally planar central sliding portion disposed therebetween, the upper end being securable outside of the house adjacent the window to enable an unobstructed space exists between the window and the ground surface therebelow, the slide portion having a length greater than the length between the window and the ground surface to enable the enlarged lower end to rest on the ground surface creating an obtuse angle with respect to the slide portion;

a plurality of weights disposed interiorly of the enlarged lower end of the slide portion;

a safety system for coupled with respect to the slide portion, the safety system preventing a user from falling off the slide portion during use, said safety system including a pair of cables extending within the channels of the raised side portions between opposing ends thereof, each of the cables having a securement strap slidably coupled thereto, the securement straps having hook and loop fasteners disposed on opposing free ends thereof for securement of the straps to wrists of a user, the securement straps each having a loop coupled therewith for coupling the securement straps to the cables.

* * * * *